US011758491B2

(12) United States Patent
Gidvani et al.

(10) Patent No.: US 11,758,491 B2
(45) Date of Patent: *Sep. 12, 2023

(54) SYSTEM AND METHOD FOR PROVIDING A SYNCHRONIZED MODE FOR WLAN OPERATION IN A WLAN BAND

(71) Applicant: Samsung Electronics Co., Ltd., Suwon-si (KR)

(72) Inventors: Ravi Gidvani, Fremont, CA (US); Ashok Ranganath, San Jose, CA (US); Wook Bong Lee, San Jose, CA (US); Sharan Naribole, San Jose, CA (US); Shailender Karmuchi, Fremont, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 171 days.

This patent is subject to a terminal disclaimer.

(21) Appl. No.: 17/373,379

(22) Filed: Jul. 12, 2021

(65) Prior Publication Data
US 2021/0345267 A1 Nov. 4, 2021

Related U.S. Application Data

(63) Continuation of application No. 16/530,902, filed on Aug. 2, 2019, now Pat. No. 11,102,740.

(60) Provisional application No. 62/791,310, filed on Jan. 11, 2019, provisional application No. 62/790,998, filed on Jan. 10, 2019, provisional application No. 62/790,678, filed on Jan. 10, 2019, provisional application No. 62/726,144, filed on Aug. 31, 2018.

(51) Int. Cl.
*H04W 56/00* (2009.01)
*H04W 84/12* (2009.01)

(52) U.S. Cl.
CPC .......... *H04W 56/001* (2013.01); *H04W 84/12* (2013.01)

(58) Field of Classification Search
CPC .......................... H04W 56/001; H04W 84/12
See application file for complete search history.

(56) References Cited

U.S. PATENT DOCUMENTS

| 9,439,219 | B2 | 9/2016 | Amini et al. |
| 2017/0245261 | A1 | 8/2017 | Cariou et al. |
| 2019/0098565 | A1 | 3/2019 | Cherian et al. |
| 2019/0208571 | A1 | 7/2019 | Ahn et al. |

(Continued)

FOREIGN PATENT DOCUMENTS

WO    2018078101 A1    5/2018

OTHER PUBLICATIONS

Rajesh Kumar Chakrawarti et al., 'Impact of IEEE 802.11e EDCA on AODV Routing Protocol in Mobile Ad-hoc Networks', 2012 Fourth International Conference on Computational Intelligence and Communication Networks, 2012 IEEE, pp. 135-139. (Year: 2012).*

*Primary Examiner* — Melvin C Marcelo
(74) *Attorney, Agent, or Firm* — Lewis Roca Rothgerber Christie LLP

(57) ABSTRACT

A method for providing a mode of wireless local area network (WLAN) operation is disclosed. The method includes: sending an association request from a wireless station (STA) over a discovery channel; receiving an association response at the STA over the discovery channel in response to the association request; and associating the STA to provide a multi-user (MU) enhanced distributed channel access (EDCA) mode using a scheduled access channel.

13 Claims, 7 Drawing Sheets

(56) References Cited

U.S. PATENT DOCUMENTS

2020/0037356 A1    1/2020   Lou et al.
2020/0068486 A1    2/2020   Asterjadhl et al.

\* cited by examiner

SYSTEM AND METHOD FOR PROVIDING A SYNCHRONIZED MODE FOR WLAN OPERATION IN A WLAN BAND

CROSS-REFERENCE TO RELATED APPLICATION(S)

This application is a continuation of U.S. patent application Ser. No. 16/530,902, filed on Aug. 2, 2019, which claims the benefits of and priority to U.S. Provisional Patent Application Ser. Nos. 62/726,144 filed Aug. 31, 2018, 62/790,678 and 62/790,998 filed Jan. 10, 2019, and 62/791,310 filed Jan. 11, 2019, the disclosures of which are incorporated herein by reference in their entirety.

TECHNICAL FIELD

The present disclosure relates generally to a wireless local area network (WLAN), more particularly, to a system and method for providing a synchronized mode for WLAN operation in a WLAN band.

BACKGROUND

Wireless local area networks (WLANs) implemented using the Institute of Electrical and Electronics Engineers (IEEE) 802.11 (Wi-Fi) standards are widely used for enabling wireless communication between wireless devices in home and office environments. The IEEE 802.11 standards provides wireless devices with an access to the Internet without connecting wires.

In a recent 802.11 IEEE (the Institute of Electrical and Electronics Engineers) Task Group ax (TGax) meeting, it is proposed to both restrict active scanning in the 6 GHz frequency band and a scheduled medium access (both trigger-based and scheduled enhanced distributed channel access (EDCA), Document No.:IEEE 11-18-1256-00-00ax" entitled "802.11ax operation in 6 GHz band" and dated Jul. 8, 2018). Restricting the EDCA for both active scanning and normal data transmission in the 6 GHz frequency band may bring certain advantages, for example, enhanced network throughput, and it may ensure implementation of fairness in the overall basic service set (BSS) performance by a central entity.

However, the proposed scheme to restrict active scanning and operate 802.11ax in the 6 GHz frequency band may have some drawbacks. Since a wireless station (STA) has more awareness of its surrounding and its own constraints for co-existence with other technologies, antenna or other resource availability that may or may not be predictable, it may not be able to influence or control its own scheduling decision. Effectively, it may not be backward compatible with presently implemented mechanisms and methods for media access (e.g., fragmentation support is optional in 802.11ax; STAs may be forced to do fragmentation).

WLAN environment provides a rich set of implementations from different AP vendors. Since scheduling of a BSS is decided by one central entity, it may act as a single point of failure. Further, round-trip time (RTT) and peer-to-peer (P2P) technologies such as neighbor awareness networking (NAN) may need to be modified to coexist with a scheduled access of the IEEE 802.11ax.

SUMMARY

An embodiment of a method for providing a mode of wireless local area network (WLAN) operation includes sending an association request from a wireless station (STA) over a discovery channel. An association response is received at the STA over the discovery channel in response to the association request. In response, the STA is associated to provide a multi-user (MU) enhanced distributed channel access (EDCA) mode using a scheduled access channel.

According to an embodiment of the method, the discovery channel and scheduled access channel may belong to either a single frequency band or a dual frequency band including 6 GHz frequency. The STA may receive trigger signals and provide data during a scheduled access period.

An embodiment of a method for providing a mode of wireless local area network (WLAN) operation includes receiving an association response at a wireless station (STA) over a discovery channel in response to an association request. In response, the STA is associated on a discovery channel to provide a multi-user (MU) enhanced distributed channel access (EDCA) mode using a scheduled access channel. A buffer status report (BSR) is sent that includes a bandwidth requirement from the STA in the scheduled access channel. An acknowledgement is received at the STA in response to the BSR. A timer is started at the STA in response to the acknowledgement.

According to an embodiment, the method includes determining that a grant received by the STA contains one or more resource units (RUs) allocated for the STA that satisfy the bandwidth requirement. The timer may be stopped and one or more data frames sent from the STA in the scheduled access channel. The one or more data frames may be provided by the STA in a scheduled access period assigned for the scheduled access channel.

According to an embodiment, the method includes determining that the timer is expired before receiving a trigger signal. One or more data frames may be sent from the STA using legacy EDCA in the scheduled access channel.

According to an embodiment, the method includes determining that no trigger signal is received at the STA. One or more data frames may be sent from the STA using legacy EDCA in the scheduled access channel. The STA may receive a high efficiency operation element. The high efficiency operation element may include one or more enhanced multi-user (MU) EDCA operation subfields corresponding to a plurality of access categories. The plurality of access categories may include at least one of a best effort access category, a background access category, a video access category, and a voice access category. A bit corresponding to each of the plurality of access categories may be set and an enhanced multi-user EDCA operation for network traffic may be enabled. The mode of WLAN operation for an access category among the plurality of access categories may be determined based on a traffic type or an application setup.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
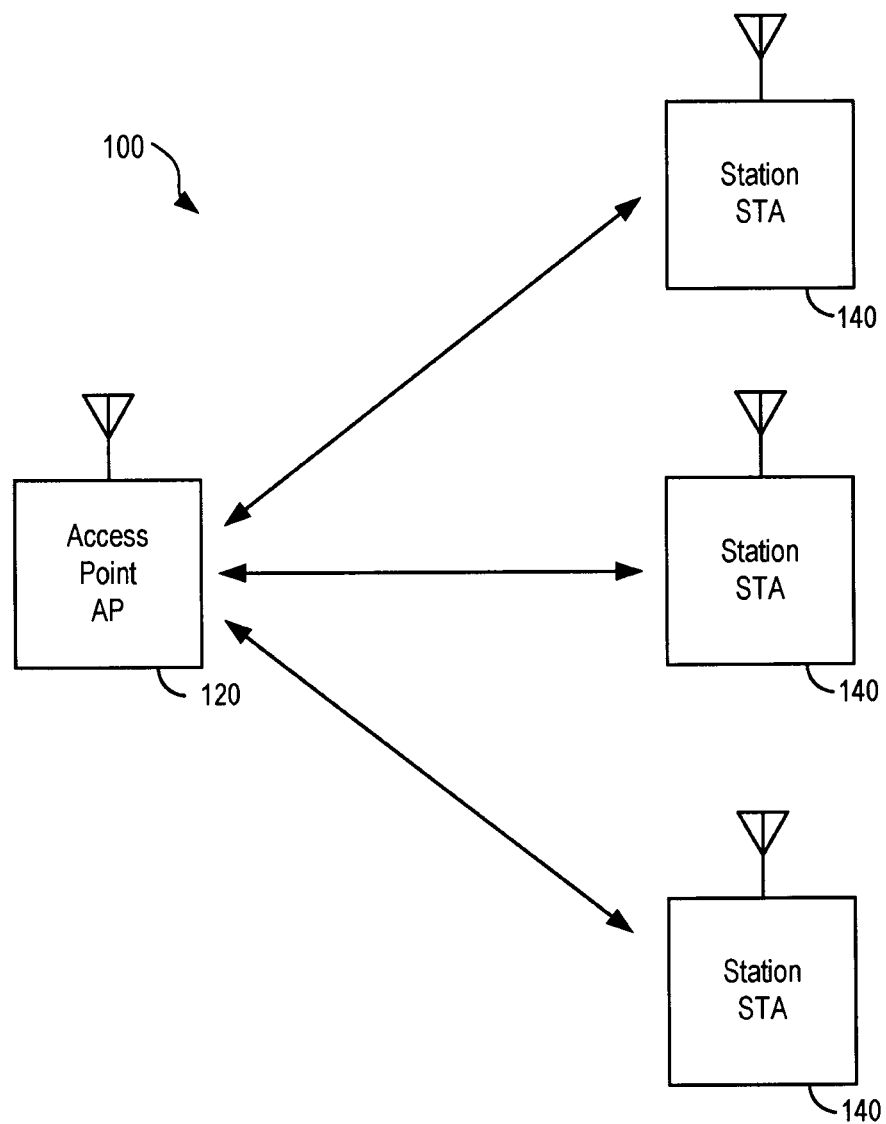
FIG. 1 is a system diagram illustrating an environment in which the present wireless communication systems and methods can be applied, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to describe a system and method for providing a synchronized mode for WLAN operation in a WLAN band. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIG. 1 is a system diagram illustrating an environment in which the present wireless communication system and method can be applied according to one embodiment. A wireless communication system 100 includes an access point (AP) 120 that may communicate with one or more wireless stations (STAs) 140. The wireless communication system 100 can be a wireless local area network (WLAN) implemented using any of the IEEE 802.11 standards. The access point 120 can communicate with one or more wireless stations 140 with which it is associated using a shared local area network protocol and over one or more shared frequency spectrum band. For example, the access point 120 and the wireless stations 140 may communicate in one or more of the 2.4 GHz frequency band, the 5 GHz frequency band, the 6 GHz band, or any combination of these frequency bands. In actual implementations, a WLAN may include one or more access points communicating to a large number of wireless stations.

In the present disclosure, the wireless station 140 is also referred to as a station or a wireless client. For example, the wireless station 140 is a mobile device, such as a mobile phone, a tablet computer, or a laptop computer. In other examples, the wireless station 140 may be a secondary device such as a printer or a desktop computer. The wireless stations 140 in the wireless communication network can communicate directly with each other on a wireless channel in an ad-hoc network. In addition, the wireless stations 140 may communicate through an access point, herein also referred to as a base station, in an infrastructure-based network. The access point 120 may be connected to a data network, such as the Internet, and enables a wireless station 140 to communicate with other nodes (e.g., other wireless stations 140) or access the data network.

In the present disclosure, access points and wireless stations in a WLAN may be referred to collectively as wireless communication devices or wireless devices. In a typical configuration, a wireless communication device includes a transceiver (transmitter/receiver) that converts radio signals received on an antenna into digital signals and processors for processing data packets.

Figure 2:
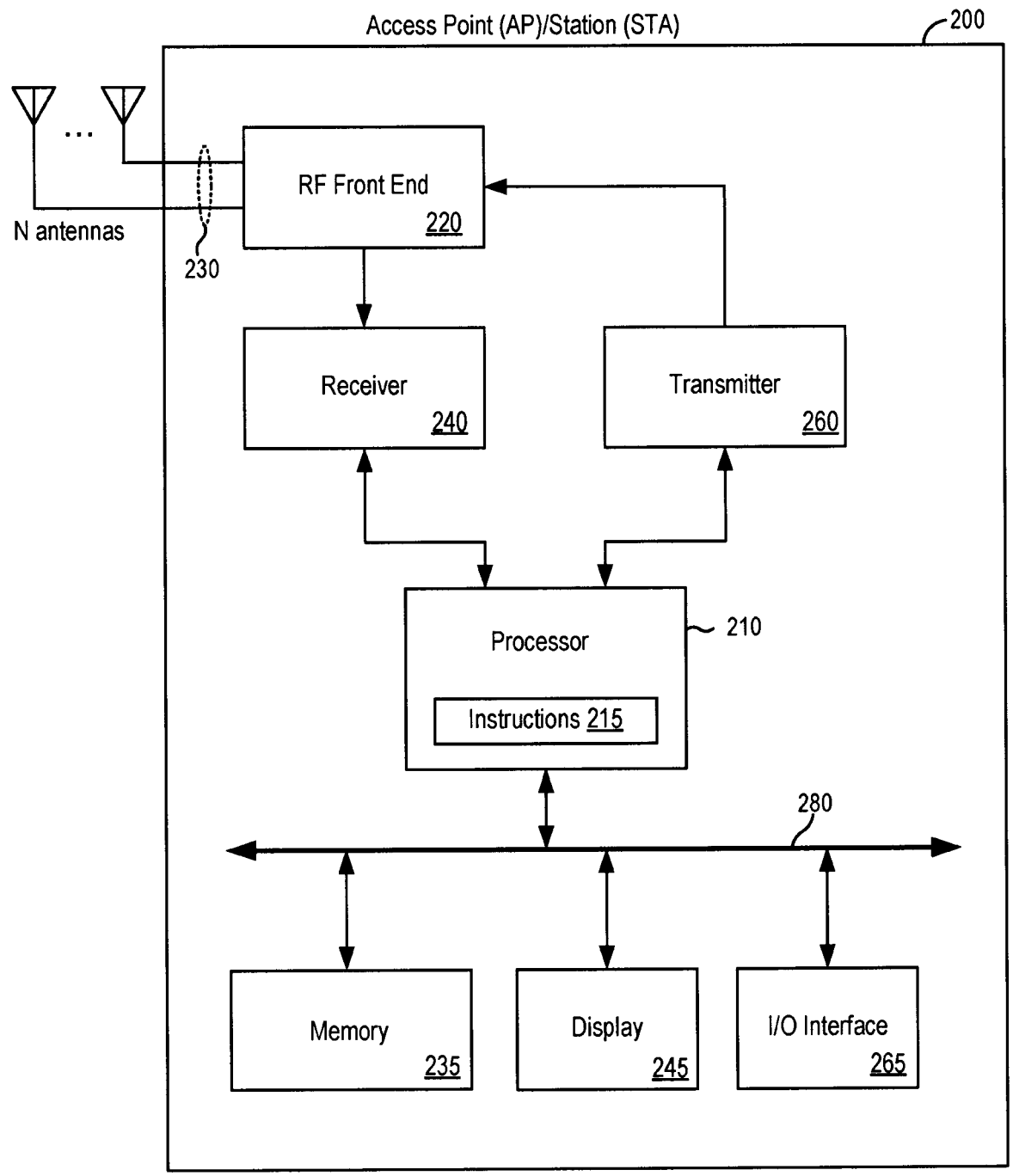
FIG. 2 is a schematic diagram of a wireless device, according to one embodiment.

FIG. 2 is a schematic diagram of a wireless device according to one embodiment. It is understood that FIG. 2 is only representative of a generic wireless device and that in actual implementations, the wireless device may use various configurations and include other elements not shown in FIG. 2. A wireless device 200 may be configured as an access point 120 or a wireless station 140 shown in FIG. 1. The wireless device 200 may include one or more antennas 230 that are coupled to a radio frequency (RF) front end 220. A receiver circuit 240 and a transmitter circuit 260 are coupled to the RF front end 220 and receive signals from and transmit signals to the antennas 203.

The wireless device 200 includes a processor 210 for controlling the operation of the wireless device 200. The processor 210 executes instructions 215 to perform various operations for receiving and transmitting data packets. The processor 210 may be in communication with a system bus 280. Through the system bus 280, the processor 210 can communicate with one or more system components of the wireless station 200. For example, the wireless station 200 may include a memory 235 for storing the instructions 215 and other data, a display 245, and an I/O interface 265 for interfacing with a user or for providing a status to the user.

When configured as an access point, the wireless device 200 may be arranged to establish connection to one or more wireless stations, process resource allocation requests received from the associated wireless stations, and transmit data packets to and receive data packets from the associated wireless stations. When configured as a wireless stations, the wireless device 200 may be arranged to establish connection to another wireless device, such as an access point or another wireless station, and transmit and receive data packets.

In embodiments of the present disclosure, the wireless communication systems and methods are configured to utilize the 6 GHz frequency band together with the 2.4 GHz frequency band and/or the 5 GHz frequency band that are defined in the IEEE 802.11 standard. In one embodiment, the 6 GHz frequency band as defined herein may cover a range between 5.925 GHz and 7.125 GHz. However, the range of the 6 GHz frequency band may slightly deviate from the 5.925-7.125 GHz range, and it may vary without deviating from the scope of the present disclosure.

According to one embodiment, the present wireless communication systems and methods may implement various channelization and operation rules for utilizing the 6 GHz frequency band with the 2.4 GHz and 5 GHz frequency bands that are defined in the IEEE 802.11 standard to increase data throughput and improve network performance. In some embodiments, the WLAN 100 of FIG. 1 implements the wireless communication systems and methods described herein to facilitate data transmission between the access point 120 and the wireless stations 140.

The IEEE 802.11ax standard provides several main features including: (1) downlink (DL)/uplink (UL) multi-user (MU) operation, (2) access point (AP)-centric scheduling, (3) spatial reuse (SR) operation, and (4) dual band operation in the 2.4 GHz and 5 GHz frequency bands. The DL/UL multi-user operation is based on a spatial multiple-in multiple-out (MIMO) multiplexing and/or an orthogonal frequency-division multiple access (OFDMA) frequency multiplexing. The AP-centric scheduling is based on a UL trigger-based operation and a target wake time (TWT) operation that provide time-division multiple access (TDMA)-like mechanism used to efficiently allocate DL/UL multi-user resources. The spatial reuse operation provides transmission on top of ongoing transmissions under certain conditions and supports both managed and unmanaged spatial reuse operation, for example, using overlapping basic service set (OBSS) preamble-detection (PD) and spatial reuse parameter (SRP). The dual band operation uses bandwidths of up to 40 MHz in the 2.4 GHz frequency band and up to 160 MHz in the 5 GHz frequency band while preserving backwards compatibility with legacy products and devices compatible with the IEEE 802.11a/b/n/ac standards. The newly proposed IEEE 802.11ax standard supports the 6 GHz frequency band operation. However, the details for operating in the 6 GHz frequency band are yet to be defined.

Scanning by STAs may be performed for primarily two reasons, an initial network recovery and roaming. For an initial network discovery, an STA that is not associated with any APs scan for a network. Roaming allows an STA that is associated with a current AP to find a better-serving AP.

The IEEE 802.11ax standard provides a unified signaling that addresses both cases of scanning. For example, 5 GHz/2.4 GHz frequency band may be used for network discovery purposes, and roaming in the 6 GHz frequency band may be allowed only under certain conditions. For roaming in the 6 GHz frequency band, an AP should be able to send a probe request for active scanning in the 6 GHz frequency band.

Figure 3:
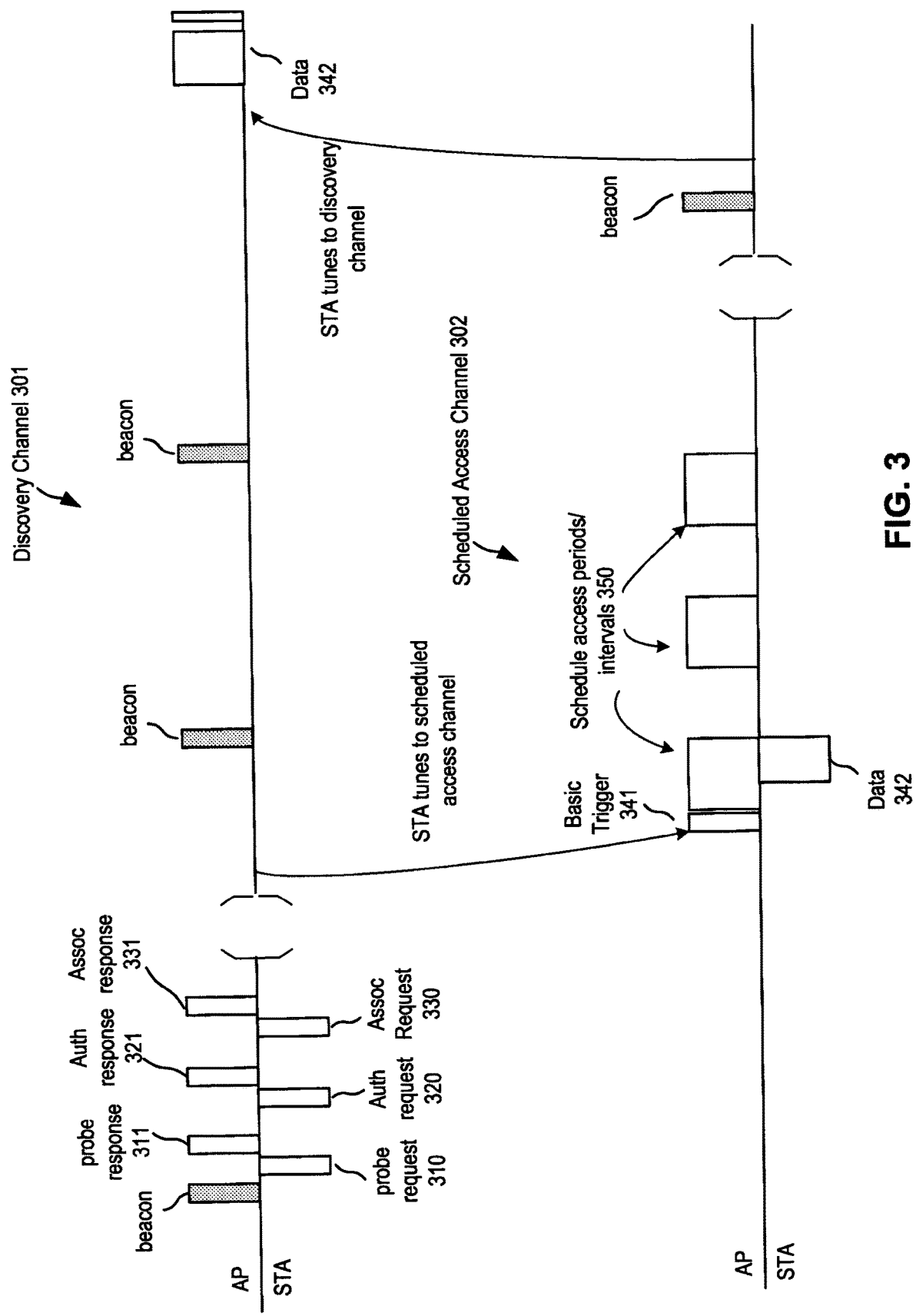
FIG. 3 illustrates an exemplary process for active scanning and association in a discovery channel and data exchange and maintenance operation over a discovery channel and a scheduled access channel, according to one embodiment.

FIG. 3 illustrates an exemplary process for active scanning and association in one channel for discovering an AP and data exchange and maintenance operation over a discovery channel and a scheduled access channel, according to one embodiment. The discovery channel is defined by an AP used for active scanning and association between the AP and the STA(s), and the scheduled access channel is used for data exchange and maintenance operation between the AP and the STA(s). In one embodiment, the discovery channel 301 and the scheduled access channel 302 are in different frequency bands. For example, the discovery channel is in a 2.4 GHz or 5 GHz frequency band, and the scheduled access channel is in a 6 GHz frequency band. In another embodiment, the discovery channel 301 and the scheduled access channel 302 are in the same frequency band, for example, any of the 2.4 GHz, 5 GHz, and 6 GHz frequency bands. An STA (e.g., STA 140 in FIG. 1) may initially establish a connection to an AP (e.g., AP 120 in FIG. 1) in the discovery channel 301 in any of the 5 GHz and 2.4 GHz frequency bands in which active scanning is performed. After association with the AP, the STA may use a 6 GHz channel for data exchange using a schedule access mode of operation. In the schedule access mode of operation, based on the information contained in a basic trigger, the STA tunes to the scheduled access channel in the 6 GHz frequency band and sends data frames in the scheduled access channel.

There may be multiple allowed triggers from the AP to the STA, corresponding to data transmissions from the STA to the AP in time windows between beacon signals generated by the AP. For example, the STA sends a unicast probe request 310 to the AP using an EDCA access or in response to a trigger frame for data grant. In response to the probe request 310, the AP sends a probe response 311 to the STA. The STA then sends an authentication request 320, and the AP responds with an authentication response 321. After the authentication is approved by the AP, the STA sends an association request 330 to the AP, and the AP responds with an association response 331. The STA associates with the AP for creating a 6 GHz BSS using its 2.4/5 GHz frequency radio. For roaming in the 6 GHz frequency band, the STA may receive information to access a neighboring BSS from the associated 6 GHz AP. If the AP does not provide this information, the STA may send another probe request 310 in the discovery channel of the 5/2.4 GHz frequency band to receive the information to access a neighboring BSS for roaming in the 6 GHz frequency band. After the first association between the AP and the STA, there is no need to perform further re-association/negotiation overhead at the scheduled access channel, and the STA can switch between the discovery channel and the scheduled access channel based on the traffic conditions and bandwidth requirements.

Post-association medium access may be performed based on a trigger-based access or a schedule EDCA access. In the trigger-based access, the AP sends a basic trigger 341 to the STA in the scheduled access channel 302, and the STA responds to the basic trigger 341 by sending a data frame 342. This may be considered as a preferred mode of operation. In the scheduled EDCA access, exchange of data frames 342 in the EDCA is provided only in scheduled service periods (SPs) 350. The AP indicates intervals of time during which EDCA is allowed. The STA can contend using EDCA during these time intervals but may not be allowed to contend outside of these intervals.

The IEEE 802.11ax standard provide implementation details for providing a transmit power control (TPC) service. The IEEE 802.11ax TPC service provides for the following features: (1) association of an STA with an AP based on the STA's power capability, (2) specification of regulatory and local max transmit power (TP) levels for a current channel, (3) selection of the transmission power (TP) for each transmission (TX) within constraints imposed by regulatory requirements, and (4) adaptation of the TP based on a range of information including a path loss and link margin estimates.

According to one embodiment, the TPC service is preserved for the STA in the 6 GHz frequency band. The STAs may inherit the main TPC functionalities to the 6 GHz frequency domain to achieve, among other things, compliance to satisfy regulatory requirements, if any (de-facto adaptation of existing rules) and performance to achieve TP selection and adaptation to control a BSS range and mitigate interference.

In one embodiment, an STA informs an AP of its minimum/maximum (min/max) transmit power capabilities when (re-)associating. The TP information element (IE) of the STA may be included in a (re-)association request frame transmitted by the STA. The AP might use the TP information element of the STA and determine a local transmit power constraint for any BSS that it maintains and determine if the association request by the STA should be rejected due to an unacceptable level of the min/max TP capabilities of the STA.

If the level of the min/max TP capabilities of the STA is acceptable, the AP declares the local maximum transmit power for the STA. This corresponds to the maximum transmit power allowed for a channel of the associated 6 GHz BSS. The power constraint information element may be included in a management signal or frame (e.g., a beacon, and a probe response) provided by the AP a management frame transmitted in 2.4/5 GHz frequency band.

According to one embodiment, the present system performs pre-association for an unassociated STA to receive the power control information from the co-located 2.4/5 GHz AP, 6 GHz AP, or 2.4/5/6 GHz neighbor AP.

According to one embodiment, the present system performs post-association to determine the STA's transmissions in the channel are subject to various conditions and/or constraints. For example, the post-association determines the regulatory maximum transmission power and local max transmission power for a channel in the current regulatory domain before transmitting in the channel. An AP STA (herein also referred to as an AP) may use a transmission power less than or equal to the regulatory max transmission power level for the channel. A non-AP STA (hereinafter also referred to as an STA) may use a transmission power less than or equal to the local max transmission power level for the channel. An STA may use any criteria, and in particular a path loss and a link margin estimate, to dynamically adapt the transmission power for transmission to another STA.

The present disclosure provides a synchronized mode for WLAN operation in the newer 6 GHz frequency band. The synchronized mode in the 6 GHz frequency band may bridges a gap between the current IEEE 802.11ax implementation in the 2.4 and 5 GHz frequency bands and a complete scheduled access. In the complete scheduled access, the STA can access the scheduled access channel 302 only in response to the AP's basic trigger 341, and the STA cannot use EDCA for a channel access. The complete scheduled access in a synchronized mode in the 6 GHz frequency band may be implemented in the following exemplary embodiments.

In the legacy 802.11ax mode of EDCA access, the STA can still use regular EDCA for data transmissions. When the STA receives an OFDMA RU grant from the AP indicating sufficient OFDMA RU satisfying the bandwidth requirement is allocated specifically for the STA, the STA uses the OFDMA RU grant for data transmission and receives an immediate acknowledgement from the AP. After receiving the acknowledgement from the AP, the STA resets the multi-user EDCA timer to a value that is advertised in the multi-user EDCA parameter set element and starts countdown to zero. During the countdown, the STA resets the EDCA contention parameters to the multi-user EDCA parameters that are advertised in the multi-user EDCA parameter set element. In this case, the multi-user EDCA parameters are considered as lower priority parameters to access the channel. This increases fairness in the network as the STA has already received an OFDMA grant from the AP indicating the AP's contention on the channel. It is noted that the STA performs the multi-user EDCA access only for the access category (or categories) of which data was transmitted to the AP in response to the AP's OFDMA trigger.

According to one embodiment, two different channels are defined in the 6 GHz frequency band. Herein, these two channels in the 6 GHz frequency band include a discovery channel and a scheduled access channel. In one embodiment, the discovery channel operates in the legacy 802.11ax mode of EDCA access and provides a triggered access for the discovery of APs. The scheduled access channel, on the other hand, provides a scheduled EDCA access. In addition, the scheduled access channel may also provide a restricted EDCA access. The legacy 802.11ax mode of the EDCA access is considered as a mandatory mode to provide backward compatibility with the current 802.11 standard, and the scheduled/restricted EDCA access may be provided as an optional mode supplementing the legacy 802.11ax mode to take advantage of the newer 6 GHz frequency band.

In one embodiment, an AP (e.g., AP 120 of FIG. 1) that is capable of running a scheduled/restricted EDCA access mode in the 6 GHz frequency band may operate on these two channels (i.e., the discovery channel and the scheduled access channel) simultaneously. These two channels may belong to either a single frequency band or a dual frequency band. Regardless, one channel of the two channels may be used for discovery and the other channel may be used for scheduled access. The AP may be beaconing and accepting association with an STA only on the discovery channel. Similarly, an STA (e.g., STA 140 of FIG. 1) that discovers APs that operate in the 6 GHz frequency band may scan only on the discovery channel. After an association with one of the APs that are discovered using the discovery channel, the STA may take advantage of the AP's optional mode of operation in the scheduled/restricted access channel and may switch to the scheduled access channel. For example, the STA may switch to the scheduled access channel if its throughput requirement is satisfied, otherwise, the STA may continue to use the legacy 802.11ax mode for the EDCA access. The STA may consider other factors such as traffic requirements, internal requirements, and network congestion, in determining to switch to the scheduled access channel. In general, an additional channel for transmitting data in a scheduled manner is beneficial.

The present embodiment employing the operation of two channels in the 6 GHz frequency band and switching from the discovery channel to the scheduled/restricted EDCA access channel after association prevents a need for the STA to send a probe request in the midst of a scheduled EDCA access. The channel that is reserved fully for a scheduled EDCA access may be kept for implementation of a next generation standard, for example, IEEE 802.11be that is also known as an extreme high throughput (EHT) mode. The present embodiment maintains the backward compatibility with the existing 802.11 implementations. In addition, the present embodiment provides foundation for separation of a control path and a data path. For example, the data can be communicated over the data path on the scheduled EDCA access channel after the discovery and association is done using the control path on the discovery channel.

Figure 4A:
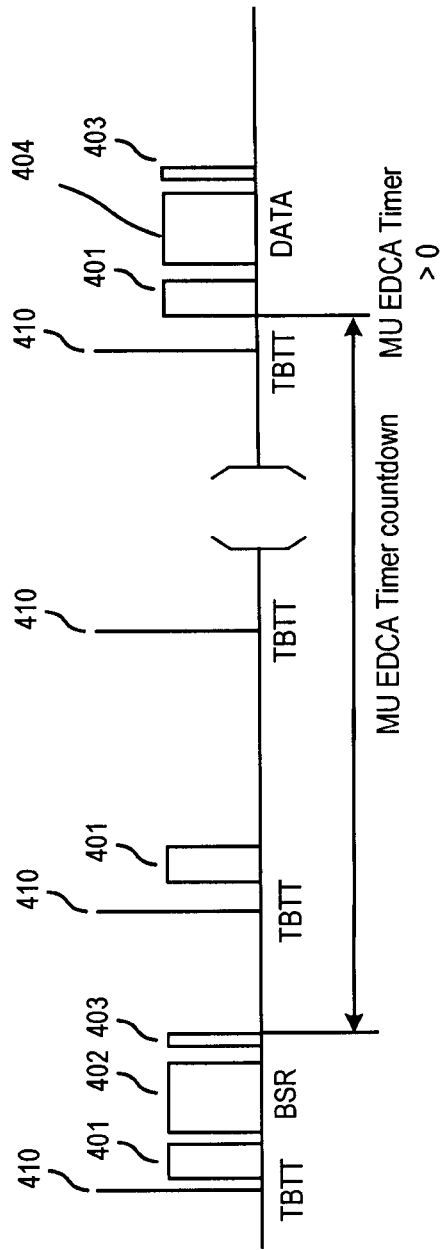
FIG. 4A shows an example case in which a grant is provided before a multi-user EDCA timer expires, according to one embodiment.
Figure 4B:
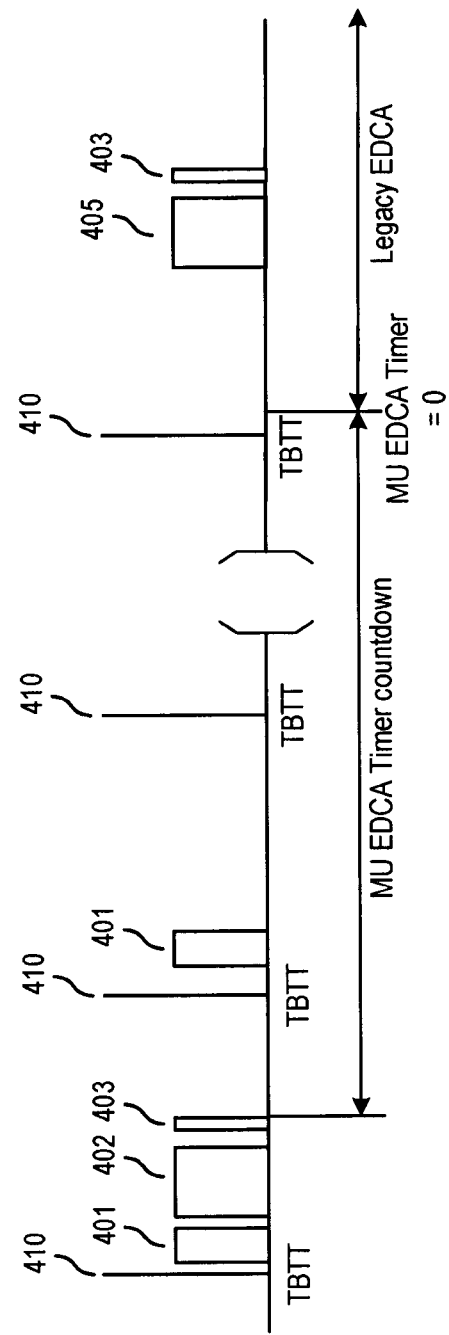
FIG. 4B shows an example case of in which no grant is provided before a multi-user EDCA timer expires, according to one embodiment.

FIG. 4A shows an example case in which a grant is provided before a multi-user (MU) EDCA timer expires, according to one embodiment. FIG. 4B shows an example case of in which no grant is provided before a multi-user EDCA timer expires, according to one embodiment. The AP sends beacons 410 at a regular interval defined as a target beacon transmission time (TBTT). The TBTT is a time interval measured in time units (TUs). For example, a TU is equal to 1024 microseconds. If the wireless medium of the AP is available at the TBTT, the beacon 410 will be transmitted then. However, if the wireless medium is busy at the TBTT, the AP contends for access to the medium like usual. If the wireless medium is busy at a second TBTT in a row, the beacon 410 may be given high priority after the current transmission.

According to another embodiment, the STA may send a buffer status report (BSR) to the AP, but the AP may not allocate any resource unit (RU) to the STA. In this case, the STA may access the scheduled access channel for transmitting data frames using legacy EDCA.

Following a mandatory random access RU grant in a trigger 401, the STA sends a buffer status report (BSR) 402 to the AP to indicate its buffer status to the AP, and the AP sends an acknowledgement 403 to the STA confirming that the AP has received the BSR from the STA. The STA may send the BSR 402 only when it has packets in the buffer and wants to indicate its buffer status to the AP. As soon as the STA's BSR is acknowledged by AP, the STA starts a multi-user EDCA timer based on the value advertised in a multi-user EDCA parameter set element. The transmission of the BSR itself could be done via a regular EDCA or via a response to trigger from the AP with the trigger containing a random access resource unit (or random RU). According to one embodiment, the STA has a multi-user EDCA timer, and the multi-user EDCA timer starts after the STA receives the acknowledgement 403 from the AP.

In comparison, according to the legacy 802.11ax mode of EDCA access, the multi-user EDCA timer countdown begins right after the STA receives an immediate acknowledgement for STA's data transmission in response to the OFDMA RU grant. According to the present synchronized mode, the STA may disable or restrict its EDCA access in the scheduled access channel, until the counter of its multi-user EDCA timer has counted down to zero. This is useful when the AP does not support an operating mode indication (OMI) procedure to disable the UL multi-user operation, or the AP may provide a sufficient access for scheduling to all of its associated STAs, and the STAs are provided with sufficient resources for their traffic requirements while participating in the scheduled access mode.

In one embodiment, the AP may provide one or more random access grant slots (e.g., random access resource units in OFDMA that can be used by STAs in the scheduled access channel to send BSRs to the AP) to allow a STA who has data to transmit but is not part of the AP's schedule to send the BSR 402 and/or the UL data using one of the random access grant slots. Herein, the random access grant slots may refer to random access resource units in OFDMA that can be used by STAs in the scheduled access channel to send BSRs to the AP.

Referring to FIG. 4A, if the STA receives an OFDMA bandwidth grant 404 from the AP for data transmission in the OFDMA bandwidth satisfying the BSR requirement, the multi-user EDCA timer stops, otherwise the countdown continues. Referring to FIG. 4B, if the STA has not received any grants from the AP by the time when the multi-user EDCA timer expires, the STA may fall back to a legacy EDCA access and sends a data frame 405 in the legacy EDCA mode. The STA that is in the legacy EDCA mode may switch to a scheduled access mode after receiving the OFDMA bandwidth grant 404 from the AP.

Figure 4C:
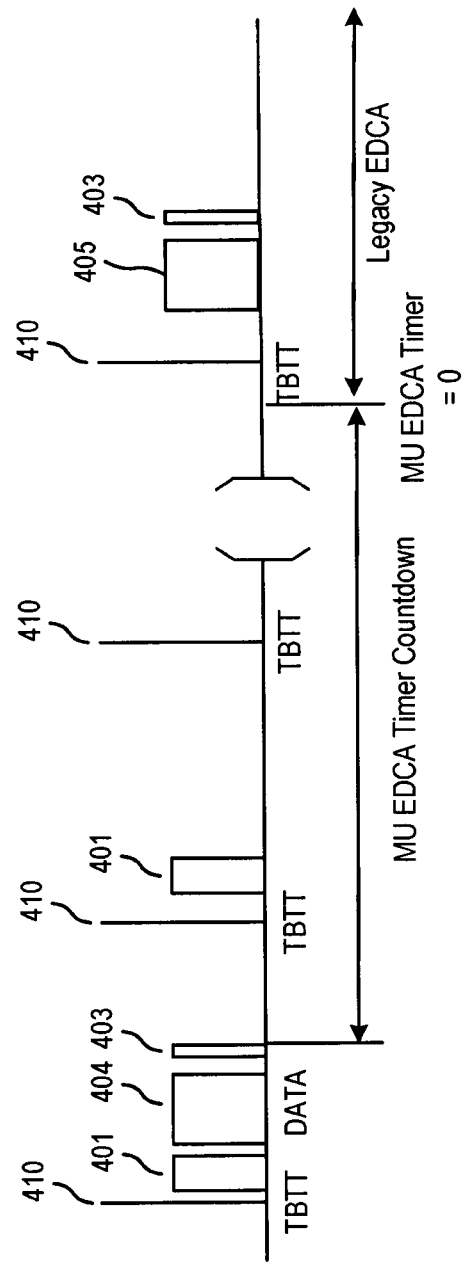
FIG. 4C shows an example case in which scheduled EDCA access is switched back to the legacy EDCA access after the multi-user EDCA timer expires, according to one embodiment.

FIG. 4C shows an example case in which scheduled EDCA access is switched back to the legacy EDCA access after the multi-user EDCA timer expires, according to one embodiment. Unlike the example of FIG. 4B, the STA has received an OFDMA bandwidth grant 404 from the AP and continues to send data frames in the scheduled access channel. During the operation in the scheduled access mode, if the MU EDCA timer expires, the STA switches back the legacy EDCA mode and send data frames in the scheduled access channel.

The present embodiment prevents a deadlock on the STA that prevents the STA from transmitting head-of-line conditions while maintaining the backward compatibility for the STA.

The present disclosure provides an enhanced mode of WLAN operation to provide a multi-user (MU) enhanced distributed channel access (EDCA). The present enhanced mode of WLAN operation improves an overall throughput of basic service sets (BSS) of the IEEE 802.11ax standard.

There are challenges to implement a complete schedule access. For example, a gaming application that has a requirement for 1 msec latency may transmit packets at any time but cannot tolerate a delay introduced by exchanging a buffer status report (BSR) and triggering a grant sequence. Certain access categories may have small packets that may be delay intolerant while other management frames may also be delay intolerant. The present disclosure provides a system and method to overcome these challenges for implementing the complete schedule access.

The present system and method includes a 6 GHz high efficiency access point (HE AP) that contains an enhanced MU EDCA operation field in a high efficiency (HE) operation element. The bit-wise definition of the HE operation element is maintained and updated by the IEEE 802.11ax high efficiency (HE) Wireless LAN task group. In one embodiment, the high efficiency operation element is transmitted on any channel (e.g., the discovery channel or the scheduled access channel) in a beacon, an association response, and a probe response. For example, the STA receives the high efficiency operation elements on the discovery channel during initial connection but the high efficiency operation elements may also be broadcasted on the scheduled access channel.

Figure 5:
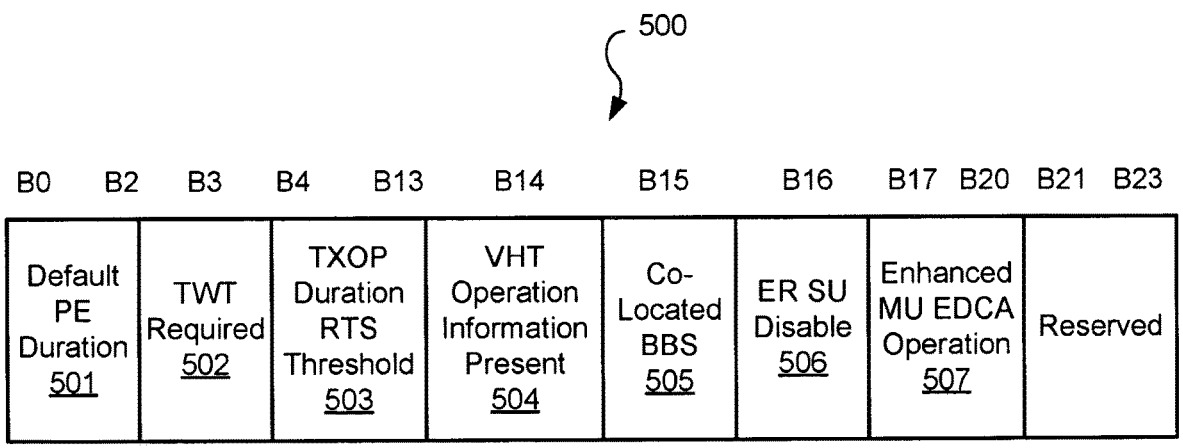
FIG. 5 shows an example of a high efficiency operation element including an enhanced multi-user EDCA operation field according to one embodiment.
Figure 6:
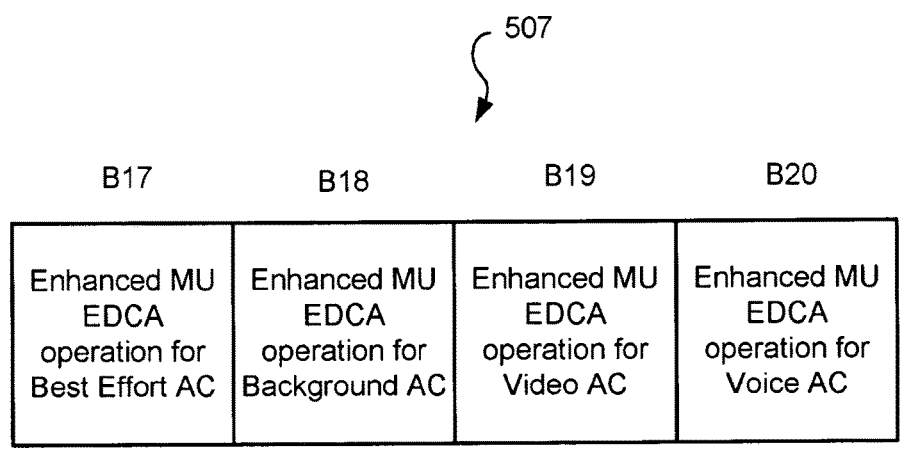
FIG. 6 shows an example of the enhanced multi-user EDCA operation field according to one embodiment.
Figure 7:
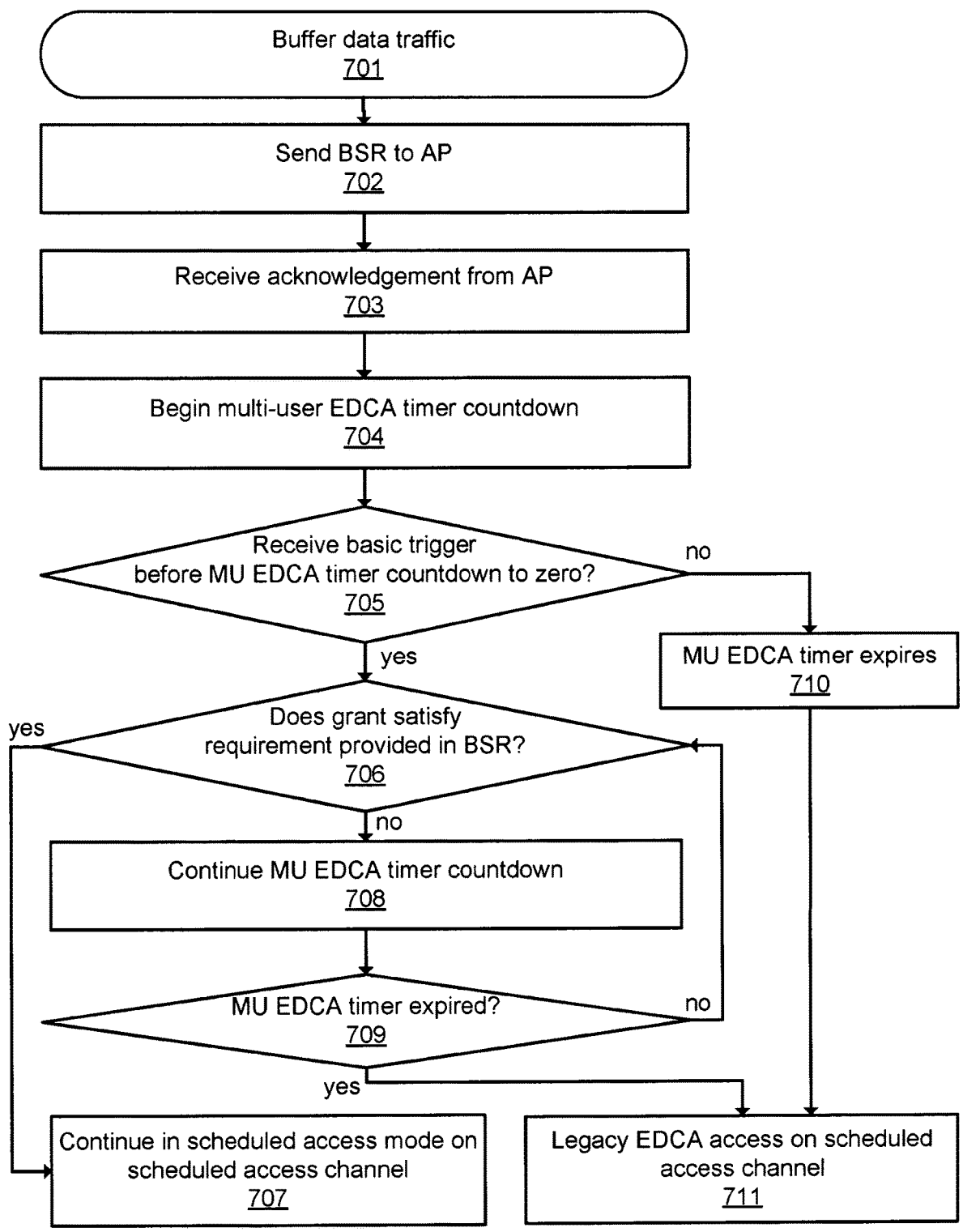
FIG. 7 is a flow chart for providing a multi-user EDCA access between an access point and a wireless station according to one embodiment.

FIG. 5 shows an example of the HE operation element including an enhanced MU EDCA operation field according to one embodiment. A 6 GHz HE AP may transmit a high efficiency (HE) operation element 500 including an enhanced MU EDCA operation field 507, for example, in a beacon, an association response, and a probe response after associating with the AP, switching between the discovery channel and a scheduled access channel to provide wireless communication between the AP and the STA based on a traffic condition and a bandwidth requirement.

The discovery channel and scheduled access channel may belong to either a single frequency band or a dual frequency band including 6 GHz frequency.

The AP and the STA may exchange trigger signals and data during a scheduled access period.

According to another embodiment, a method for providing a mode of wireless local area network (WLAN) operation includes: associating with an access point (AP) at a request from a wireless station (STA) on a discovery channel to provide a multi-user (MU) enhanced distributed channel access (EDCA) mode between the AP and the STA using a scheduled access channel; sending a buffer status report (BSR) including a bandwidth requirement from the STA to the AP in the scheduled access channel; sending an acknowledgement from the AP to the STA in response to the BSR; and starting a timer at the STA in response to the acknowledgement.

The method may further include: determining that a grant received from the AP contains one or more resource units (RUs) allocated for the STA that satisfy the bandwidth requirement; stopping the timer; and sending one or more data frames from the STA to the AP in the scheduled access channel.

The trigger and the one or more data frames may be exchanged between the AP and the STA in a scheduled access period assigned for the scheduled access channel.

The method may further include: determining that the timer is expired before receiving the trigger from the AP; and sending one or more data frames from the STA to the AP using legacy EDCA on the scheduled access channel.

The method may further include: determining that no trigger is received from the AP; and sending one or more data frames from the STA to the AP using legacy EDCA in the scheduled access channel.

The AP may send a high efficiency operation element to the STA.

The high efficiency operation element may include one or more enhanced multi-user (MU) EDCA operation subfields corresponding to a plurality of access categories.

The plurality of access categories may include at least one of a best effort access category, a background access category, a video access category, and a voice access category.

When a bit corresponding to each of the plurality of access categories is set, an enhanced multi-user EDCA operation for network traffic may be enabled.

The mode of WLAN operation for an access category among the plurality of access categories may be determined based on a traffic type or an application setup.

According to another embodiment, a wireless local area network (WLAN) system includes: an access point (AP); a wireless station (STA); and a WLAN communication network operating a discovery channel and a scheduled access channel to provide wireless communication between the AP and the STA. After associating with the AP, the STA is configured to switch from the discovery channel to the scheduled access channel to provide a multi-user (MU) enhanced distributed channel access (EDCA) mode based on a traffic condition and a bandwidth requirement.

The discovery channel and scheduled access channel may belong to either a single frequency band or a dual frequency band including 6 GHz frequency.

The AP and STA may exchange trigger signals and data during a scheduled access period as determined by the MU EDCA mode.

According to another embodiment, a wireless local area network (WLAN) system includes: an access point (AP); a wireless station (STA); and a WLAN communication network operating a discovery channel and a scheduled access channel to provide wireless communication between the AP and the STA. The STA is configured to: send a request on a discovery channel to the AP to associate with the AP for providing a multi-user (MU) enhanced distributed channel access (EDCA) mode between the AP and the STA using a scheduled access channel; send a buffer status report (BSR) including a bandwidth requirement to the AP in the scheduled access channel; receive an acknowledgement from the AP in response to the BSR; and start a timer in response to the acknowledgement.

The STA may be further configured to: determine that a grant received from the AP contains one or more resource units (RUs) allocated for the STA that satisfy the bandwidth requirement; stop the timer; and send one or more data frames from the STA to the AP in the scheduled access channel.

The AP may send a high efficiency operation element to the STA, and the high efficiency operation element may include one or more enhanced multi-user (MU) EDCA operation subfields corresponding to a plurality of access categories.

The plurality of access categories may include at least one of a best effort access category, a background access category, a video access category, and a voice access category.

The above example embodiments have been described hereinabove to illustrate various embodiments of implementing a system and method for providing an enhanced mode for WLAN operation in a newer WLAN band. Various modifications and departures from the disclosed example embodiments will occur to those having ordinary skill in the art. The subject matter that is intended to be within the scope of the invention is set forth in the following claims.

What is claimed is:

1. A method for providing a mode of wireless local area network (WLAN) operation comprising:
   sending an association request from a wireless station (STA) over a discovery channel;
   receiving an association response at the STA over the discovery channel in response to the association request; and
   associating the STA to provide a multi-user (MU) enhanced distributed channel access (EDCA) mode using a scheduled access channel.

2. The method of claim 1, wherein the discovery channel and scheduled access channel may belong to either a single frequency band or a dual frequency band including 6 GHz frequency.

3. The method of claim 1, wherein the STA receives trigger signals and provides data during a scheduled access period.

4. A method for providing a mode of wireless local area network (WLAN) operation comprising:
   receiving an association response at a wireless station (STA) over a discovery channel in response to an association request;
   associating the STA on a discovery channel to provide a multi-user (MU) enhanced distributed channel access (EDCA) mode using a scheduled access channel;
   sending a buffer status report (BSR) including a bandwidth requirement from the STA in the scheduled access channel;
   receiving an acknowledgement at the STA in response to the BSR; and
   starting a timer at the STA in response to the acknowledgement.

5. The method of claim 4, further comprising:
   determining that a grant received by the STA contains one or more resource units (RUs) allocated for the STA that satisfy the bandwidth requirement;
   stopping the timer; and
   sending one or more data frames from the STA in the scheduled access channel.

6. The method of claim 5, wherein the one or more data frames are provided by the STA in a scheduled access period assigned for the scheduled access channel.

7. The method of claim 4, further comprising:
   determining that the timer is expired before receiving a trigger signal; and
   sending one or more data frames from the STA using legacy EDCA in the scheduled access channel.

8. The method of claim 4, further comprising:
   determining that no trigger signal is received at the STA; and
   sending one or more data frames from the STA using legacy EDCA in the scheduled access channel.

9. The method of claim 4, wherein the STA receives a high efficiency operation element.

10. The method of claim 9, wherein the high efficiency operation element includes one or more enhanced multi-user (MU) EDCA operation subfields corresponding to a plurality of access categories.

11. The method of claim 10, wherein the plurality of access categories includes at least one of a best effort access category, a background access category, a video access category, and a voice access category.

12. The method of claim 11, wherein, when a bit corresponding to each of the plurality of access categories is set, an enhanced multi-user EDCA operation for network traffic is enabled.

13. The method of claim 10, wherein the mode of WLAN operation for an access category among the plurality of access categories is determined based on a traffic type or an application setup.

* * * * *